United States Patent
White et al.

(10) Patent No.: US 10,583,659 B2
(45) Date of Patent: Mar. 10, 2020

(54) SYSTEMS AND METHODS FOR DETERMINING A FILL STATUS OF AN INKJET CARTRIDGE

(71) Applicant: Retail Inkjet Solutions, Inc., Carlsbad, CA (US)

(72) Inventors: Kraig David White, San Diego, CA (US); Chris Alan Stratford, Valley Center, CA (US); Juan Manuel Jimenez, Escondido, CA (US); Wallace Earl Owen, San Diego, CA (US)

(73) Assignee: Retail Inkjet Solutions, Inc., Carlsbad, CA (US)

( * ) Notice: Subject to any disclaimer, the term of this patent is extended or adjusted under 35 U.S.C. 154(b) by 0 days.

(21) Appl. No.: 15/947,462

(22) Filed: Apr. 6, 2018

(65) Prior Publication Data

US 2018/0311962 A1 Nov. 1, 2018

Related U.S. Application Data

(60) Provisional application No. 62/491,138, filed on Apr. 27, 2017.

(51) Int. Cl.
*B41J 2/175* (2006.01)
*G06F 3/12* (2006.01)

(52) U.S. Cl.
CPC ......... *B41J 2/17506* (2013.01); *B41J 2/1752* (2013.01); *B41J 2/17513* (2013.01); *B41J 2/17546* (2013.01); *B41J 2/17559* (2013.01); *B41J 2/17566* (2013.01); *G06F 3/1229* (2013.01)

(58) Field of Classification Search
CPC ................ B41J 2/17506; B41J 2/17559; B41J 2/17546; B41J 2/17566; B41J 2/17513; G06F 3/1229
See application file for complete search history.

(56) References Cited

U.S. PATENT DOCUMENTS

| | | | | |
|---|---|---|---|---|
| 6,341,853 | B1 * | 1/2002 | Scheffelin | B41J 2/175 347/87 |
| 6,913,336 | B2 * | 7/2005 | Hara | B41J 2/17566 347/7 |
| 6,969,137 | B2 * | 11/2005 | Maeda | B41J 2/17513 347/7 |
| 6,976,746 | B2 * | 12/2005 | Shimamura | B41J 2/1721 347/7 |
| 7,883,188 | B2 * | 2/2011 | Scanlan | B41J 2/17506 347/85 |
| 8,161,199 | B1 | 4/2012 | Weiser et al. | |
| 9,876,921 | B2 * | 1/2018 | Koganehira | B41J 2/17509 |

(Continued)

OTHER PUBLICATIONS

International Search Report and Written Opinion dated Aug. 3, 2018 for International Application No. PCT/US2018/026315, filed Apr. 5, 2018.

*Primary Examiner* — Huan H Tran
(74) *Attorney, Agent, or Firm* — Knobbe, Martens, Olson & Bear, LLP

(57) ABSTRACT

Embodiments provide an integrated scale and method for determining a fill status of an inkjet cartridge. In some embodiments, the system can display the fill status on a user interface. The fill status can be generalized based on the type of inkjet cartridge and range of measured weights and/or percentages of pre-set weight.

7 Claims, 4 Drawing Sheets

(56) References Cited

U.S. PATENT DOCUMENTS

| | | |
|---|---|---|
| 2004/0040614 A1 | 3/2004 | Sesek et al. |
| 2004/0252337 A1 | 12/2004 | Takabayashi et al. |
| 2005/0046650 A1* | 3/2005 | Moriyama ............. B41J 2/1752 347/7 |
| 2007/0051421 A1 | 3/2007 | Sarnoff et al. |
| 2007/0146448 A1* | 6/2007 | Chung ................. B41J 2/17506 347/86 |
| 2007/0285446 A1* | 12/2007 | Shinada ............... B41J 2/17546 347/7 |
| 2007/0285481 A1* | 12/2007 | Scanlan ............... B41J 2/17506 347/86 |
| 2009/0153602 A1* | 6/2009 | Brown ................. B41J 2/17506 347/7 |
| 2009/0278872 A1 | 11/2009 | Turgeman |
| 2012/0081422 A1 | 4/2012 | Kura |

\* cited by examiner

SYSTEMS AND METHODS FOR DETERMINING A FILL STATUS OF AN INKJET CARTRIDGE

CROSS-REFERENCE TO RELATED APPLICATIONS

This application claims priority to U.S. provisional application Ser. No. 62/491,138 entitled "SYSTEMS AND METHODS FOR DETERMINING A FILL STATUS OF AN INKJET CARTRIDGE" filed on Apr. 27, 2017, which is incorporated by reference in its entirety.

BACKGROUND

Field

This disclosure relates to systems and methods for refilling inkjet cartridges. More specifically, this disclosure relates to systems and methods for refilling an inkjet cartridge, such as determining the fill status of the inkjet cartridge.

Background

In the personal and business computer market, inkjet printers are very common. Inkjet printers are inexpensive, quiet, fast and produce high quality output. However, replacement cartridges can be expensive. Although some manual inkjet refilling kits are available, they can be difficult and messy for individuals to use, and inkjet cartridges may become damaged during the refilling task, especially when performed by inexperienced users. As such, individuals may bring these inkjet cartridges to a retail store for refilling inkjet cartridges. In a retail store environment for refilling inkjet cartridges, customers may request a fill status of their inkjet cartridge prior to requesting that the retail store proceed with refilling the inkjet cartridge. Moreover, the retail store operator and/or customer may wish to confirm fill status of the inkjet cartridge after a refilling operation has been performed.

SUMMARY

Example embodiments described herein have several features, no single one of which is indispensable or solely responsible for their desirable attributes. Without limiting the scope of the claims, some of the advantageous features will now be summarized. While the features and structures are described below in connection with embodiments of inkjet cartridges such as inkjet cartridges having an integrated printhead and inkjet cartridges for use with inkjet printers having a printhead, it is to be understood that the features and structures can be implemented in any ink or toner source capable of being replaced or refilled (e.g., a laser toner cartridge for use with a laser printer, LED printed supplies for use with an LED printer, etc.) as well as any other consumable having a programmable or resettable electronics. After considering this discussion, and particularly after reading the section entitled "Detailed Description" one will understand how the features of the embodiments described herein provide advantages that include more efficient and environmentally friendly refilling of inkjet cartridges.

In some embodiments, a system can refill an inkjet cartridge and/or determine a fill status of an inkjet cartridge. The system can include a fill station configured to refill an inkjet cartridge. The system can include a scale. The scale can include a sensor which can provide a measurement. The measurement can include at least one of a mass or weight of an inkjet cartridge. The system can include a user interface. The system can include a control system. The control system can determine a type of inkjet cartridge on which the measurement is based. The control system can determine a fill status of an inkjet cartridge based on the measurement. The control system can display the fill status on the user interface.

In some embodiments, the control system can determine the type of inkjet cartridge via a user input. In some embodiments, the control system can determine the type of inkjet cartridge by reading electronics of the inkjet cartridge.

In some embodiments, the fill status can be a general fill status. The general fill status can include a discrete number of statuses corresponding to ranges of pre-defined measurements of the type of inkjet cartridge. In some embodiments, the ranges of pre-defined measurements can include at least one of pre-defined masses or weights of the type of inkjet cartridge. In some embodiments, the ranges of pre-defined measurements can include percentages of a pre-defined mass or weight of the type of inkjet cartridge. In some embodiments, the ranges of pre-defined measurements can include percentages of a pre-defined fill mass or fill weight of the type of inkjet cartridge.

In some embodiments, a method of determining a fill status of an inkjet cartridge is provided. The method can be implemented with a scale. The method can include detecting an inkjet cartridge on the scale. The method can include measuring a mass or weight of the inkjet cartridge on the scale in response to detecting the inkjet cartridge. The method can include obtaining cartridge information, the cartridge information providing a type of inkjet cartridge being measured. The method can include determining a fill status of the inkjet cartridge, the fill status being selected from one of multiple fill statuses based on a measured mass or weight of the inkjet cartridge.

In some embodiments, detecting an inkjet cartridge on the scale can include detecting a deviation from a default signal received from a sensor of the scale. In some embodiments, obtaining information on a type of inkjet cartridge can include receiving an input providing cartridge information. In some embodiments, obtaining information on a type of inkjet cartridge can include receiving cartridge information based on electronics on the inkjet cartridge.

In some embodiments, determining a fill status of the inkjet cartridge can include comparing a measured mass or weight of the inkjet cartridge with a table of providing fill statuses based on ranges of measured mass and weights.

In some embodiments, the method can include calibrating the scale. Calibrating the scale can be performed before measuring a mass or weight of the inkjet cartridge.

BRIEF DESCRIPTION OF THE DRAWINGS

These and other features, aspects and advantages are described below with reference to the drawings, which are intended to illustrate embodiments of inkjet refilling systems including embodiments of various components of these inkjet refilling systems.

DETAILED DESCRIPTION

Figure 1:
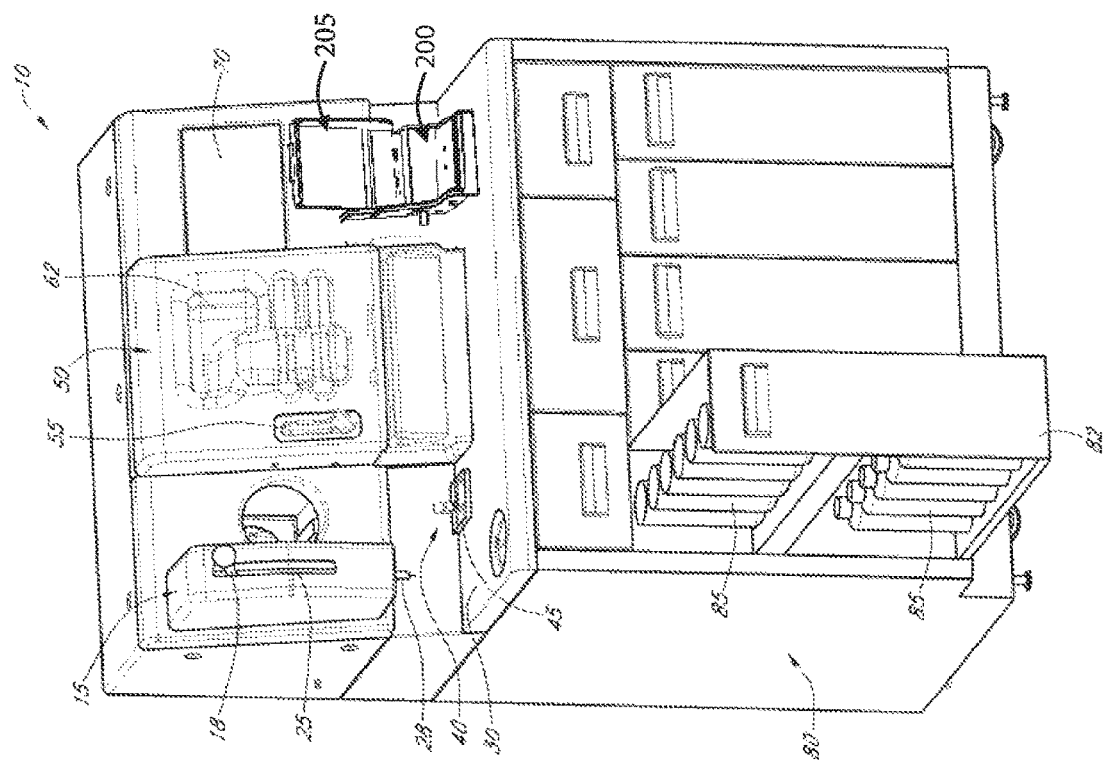
FIG. 1 is a front perspective view of an embodiment of an inkjet refilling system.

Certain terminology may be used in the following description for the purpose of reference only, and thus are not intended to be limiting. For example, terms such as "upper", "lower", "upward", "downward", "above", "below", "top", "bottom" and similar terms refer to directions in the drawings to which reference is made. Such terminology may include the words specifically mentioned above, derivatives thereof, and words of similar import. Similarly, the terms "first", "second", and other such numerical terms referring to structures neither imply a sequence or order unless clearly indicated by the context.

While the present description sets forth specific details of various embodiments, it will be appreciated that the description is illustrative only and should not be construed in any way as limiting. Additionally, although particular embodiments may be disclosed or shown in the context of particular types of printing systems, such as an inkjet printer and associated inkjet cartridges, it is to be understood that any elements of the disclosure may be used in any type of printing system such as, but not limited to, laser printers, LED printers, and associated ink or toner sources.

The Inkjet Refilling System

With reference first to FIG. 1, an inkjet refilling system 10 is shown. As shown in the illustrated embodiment, the system can be a floor-standing unit. However, it is to be understood that the system can take on different form-factors, such as a desk-top unit. The system includes a drill station 15 having an actuator 18. In the embodiment shown, the actuator 18 comprises a handle on a lever. In this embodiment, an on/off switch activates the drill. Thus, when the lever is moved downward, the drill becomes active. A slide channel 25 allows the actuator to slide up and down as the drill is engaged with an inkjet cartridge.

A covered self-centering drill bit 28 protrudes from the lower portion of the drill station, and is connected to the actuator 18 so that movement of the actuator 18 within the slide channel 25 results in the covered drill bit 28 moving up and down. Beneath the covered drill bit 28 is a flat surface 30 where adapters or fixtures are placed containing inkjet cartridges or tanks to be drilled. Once a fixture has been placed on the flat surface 30 and aligned beneath the drill bit 28, any of several on/off switches, known in the art, can be used to activate the self-centering drill bit 28. The actuator 18 is then slid down within the slide channel 25 until the drill bit 28 drills a hole within the cartridge or tank. In one alternative embodiment, the drill mechanism may be configured such that the drill activates and begins to spin the drill bit as soon as the handle is lowered from the top of the spring-biased upper position in the slide channel 25. As used herein, the term "inkjet cartridge" means a typical cartridge having a print head, and also includes an inkjet tank that does not include an inkjet print head.

Adjacent the drilling station 15 is a cleaning station 40 which is configured to receive an inkjet cartridge and remove any excess ink from the cartridge prior to refilling. In this embodiment, the cleaning station 40 includes a mounting station 45 which is adapted to receive the plurality of the fixtures described above. A portion of the mounting station 45 includes an evacuation station that communicates with a vacuum source in order to evacuate the ink from any cartridge that is inserted into the mounting station 45.

Within a central portion 50 of the system 10 can include a nozzle refilling station 55 that is configured to receive an inkjet cartridge and refill that cartridge through its nozzles. As is known in the art, inkjet cartridges eject ink from a set of nozzles. In some cases it is possible to refill or clean inkjet cartridges by forcing ink or cleaning solutions into the cartridge through the nozzles. One example of such a cartridge is the Hewlett Packard Model HP45 inkjet cartridge. When the cartridge is placed within the nozzle refilling station 55, the system forces a predetermined quantity of ink into the cartridge through the nozzles. In some embodiments, the nozzle refilling station 55 also includes a vacuum source so that prior to nozzle filling the inkjet cartridge it can be evacuated to remove any unused ink. As shown, the central portion 50 can include a door 62 that seals a vacuum chamber when closed to allow a low pressure environment to be created by the vacuum source. In this manner the system knows the proper amount of ink to use in refilling the cartridge. In another embodiment, the nozzle refilling station 55 includes a wash solution source that can be used to rinse the interior of the cartridge prior to refilling. Wash solution may include sterile filtered water, or a cleansing solution adapted for cleaning inkjet cartridges.

Adjacent the central portion 50 is a user interface 70 which is used by the operator to control each step in the refilling process. In some embodiments, the user interface comprises a touch screen graphical user interface. However, it is to be understood that the user interface can include one or more visual displays and one or more input devices such as keypads. The user interface is linked to a central computer system (not shown) that controls all of the functions of the system 10. By inputting commands through the user interface 70, an operator can perform the functions described herein.

Within a lower portion 80 of the system 10 is a drawer 82 that provides a series of ink refill bottles 85. These bottles provide the source of ink used within the system to refill the inkjet cartridges.

The system can include a scale 200. As shown in the illustrated embodiment, the scale 200 can include a cover 205 which can be moved to shield the scale 200 when the scale 200 is not in use.

Integrated Scale

Figure 2:
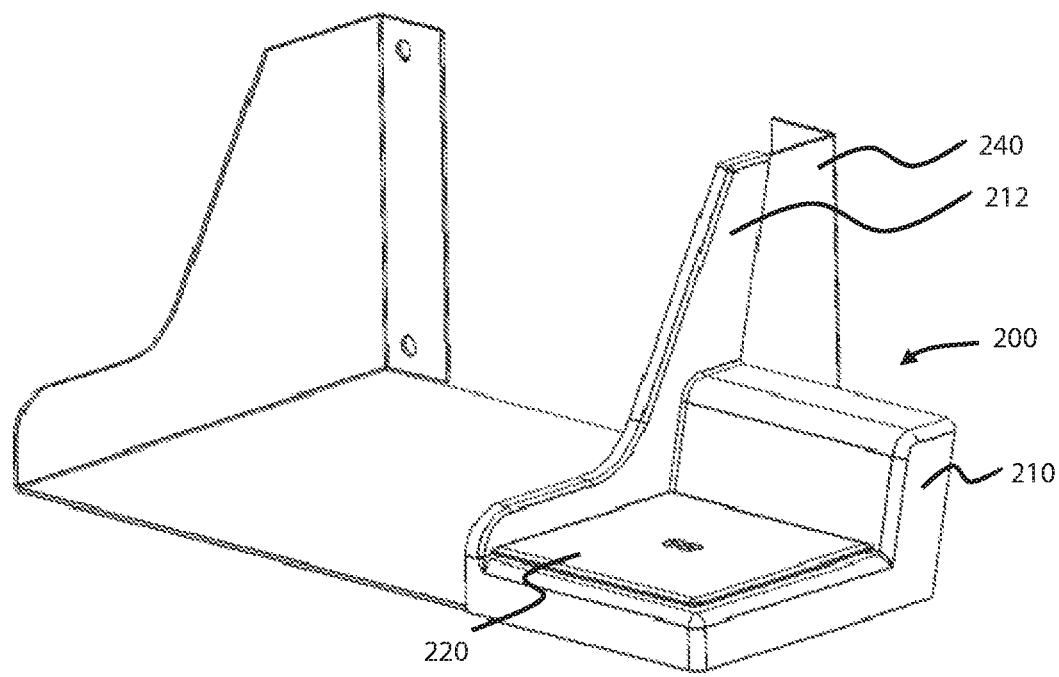
FIG. 2 is a front perspective view of an embodiment of an integral scale attached to a frame of a modular cartridge configuration system.
Figure 4:
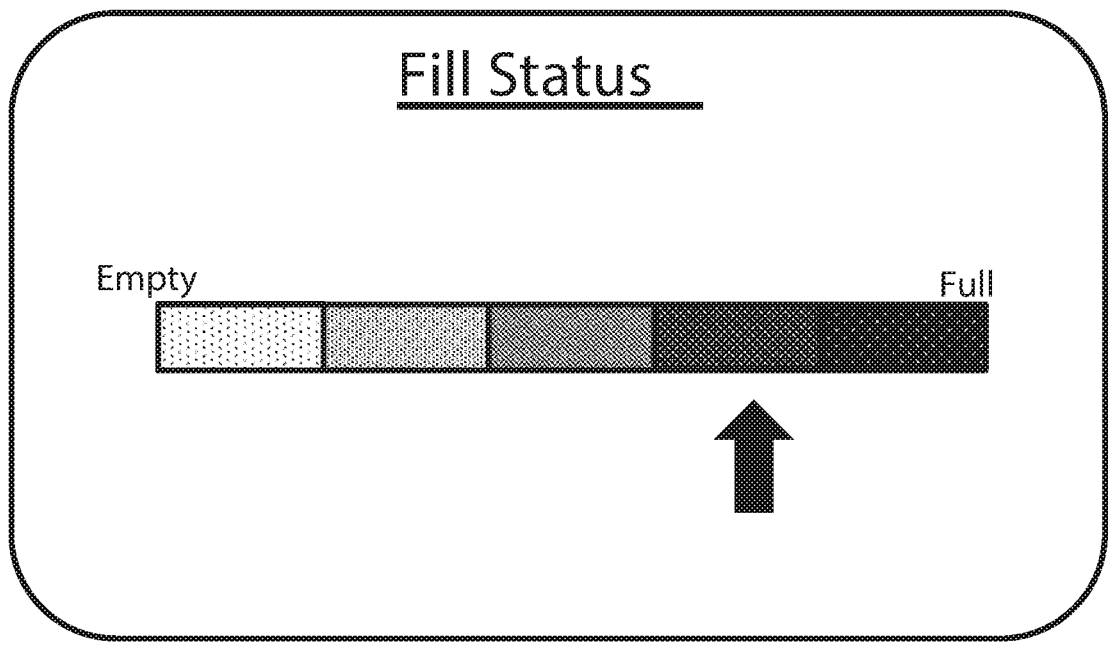
FIG. 4 is a diagram of a user interface illustrating a fill status.

FIG. 2 illustrates a front perspective view of a scale 200 without the cover. The scale 200 can be attached to components of an inkjet refilling system, such as inkjet refilling system 10. The scale can be used to measure a mass and/or weight of an inkjet cartridge. In some embodiments, the scale 200 can be used to provide a fill status of the inkjet cartridge. For example, the scale 200 can provide fill statuses based on the measured mass or weight of the inkjet cartridge. In some embodiments, the scale 200 can provide generalized fill statuses. These generalized fill statuses provide an approximation of the fill status (as shown in FIG. 4). In some implementations, the scale 200 can provide specific fill statuses such as a percentage based on a range of weights of the type of inkjet cartridge being measured and/or the measured weight itself.

Figure 3:
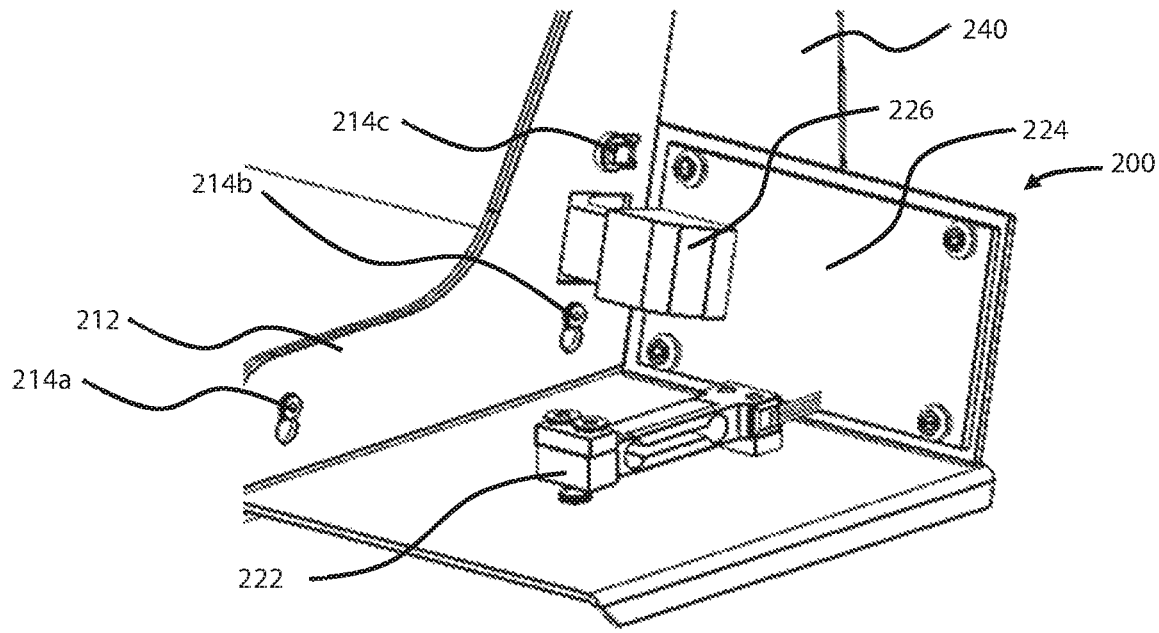
FIG. 3 is a front perspective view of the integral scale of FIG. 2, with portions removed to illustrate internal components.

As shown in the illustrated embodiment, the scale 200 can include a housing 210 and a plate 220 upon which an object, such as an inkjet cartridge (not shown), can be placed. The housing 210 can be attached to another component of the inkjet refilling system, such as a frame 240. In some embodiments, the housing 210 can include a connector wall 212 which can be coupled to the frame 240 of another system, such as an inkjet refilling system. The coupling can be a snap-fit or slide-fit coupling to allow the scale 200 to be more easily removed for replacement and/or servicing. As shown in FIG. 3, the scale 200 is coupled to the frame 240 via multiple fasteners 214*a*, 214*b*, 214*c* inserted into keyholes. The scale 200 can include one or more retention mechanisms, such as a magnet, to ensure that the scale 200 remains stationary. In some embodiments, the scale 200 can include a cover (not shown) which can be opened and closed to provide access to the plate 220. The cover can reduce the likelihood of contacting other scale components, such as the plate 220, when the scale 200 is not in use.

FIG. 3 illustrates portions of the housing 212 removed to illustrate internal components of the scale 200, a mass or weight sensor 222 can be positioned below the plate 220. The sensor 222 can be electrically coupled to a circuit board 224. As shown in the illustrated embodiment, the scale 200 can include an interface 226 which can allow the scale to communicate with other components of an inkjet refilling system as discussed in further detail below. The interface 226 can be attached to a port of another system, such as an inkjet refilling system.

The Inkjet Refilling System with Scale

Figure 5:
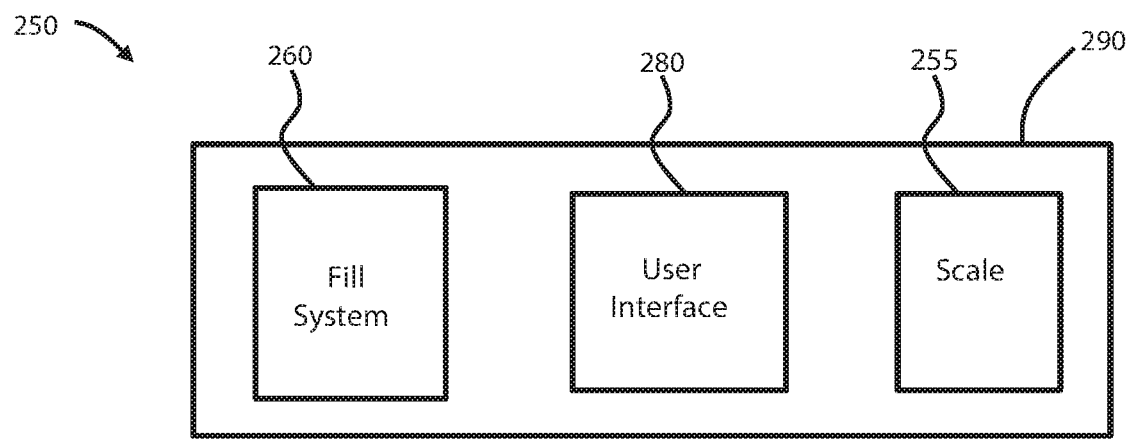
FIG. 5 is a schematic of an embodiment of an inkjet refilling system.

With reference next to FIG. 5, an inkjet refilling system 250 is shown with scale 255 which is an icon of the scale 200 described above in connection with FIGS. 2 and 3. The inkjet refilling station 250 can include a fill system 260 which can allow an operator to refill an inkjet cartridge and can include components, structures, features and/or functionality which are similar to, or the same as, those of the inkjet refilling system 10 described in connection with FIG. 1. For example, the fill station 260 can include stations such as a drill station, cleaning station, mounting station, and nozzle refilling station similar to those described above in connection with the inkjet refilling system 10 described in FIG. 1. The fill station 260 can include other stations including, but not limited to, a test station.

The inkjet refilling system 250 can also include a user interface 280 which can include control inputs such as buttons and/or a screen such as a touchscreen. The user interface 280 can include components, structures, features and/or functionality similar to the user interface 70.

The inkjet refilling system 250 can include a housing 290. For example, the housing 290 can be a floor-standing unit on which the scale 255, fill system 260, and/or user interface 280 can be attached. However, it is to be understood that the system can take on different form-factors, such as a desk-top unit. The scale 255 can communicate with one or more of the fill system 260, and/or user interface 280 via the interface 226.

Method for Determining Fill Status

Figure 6:
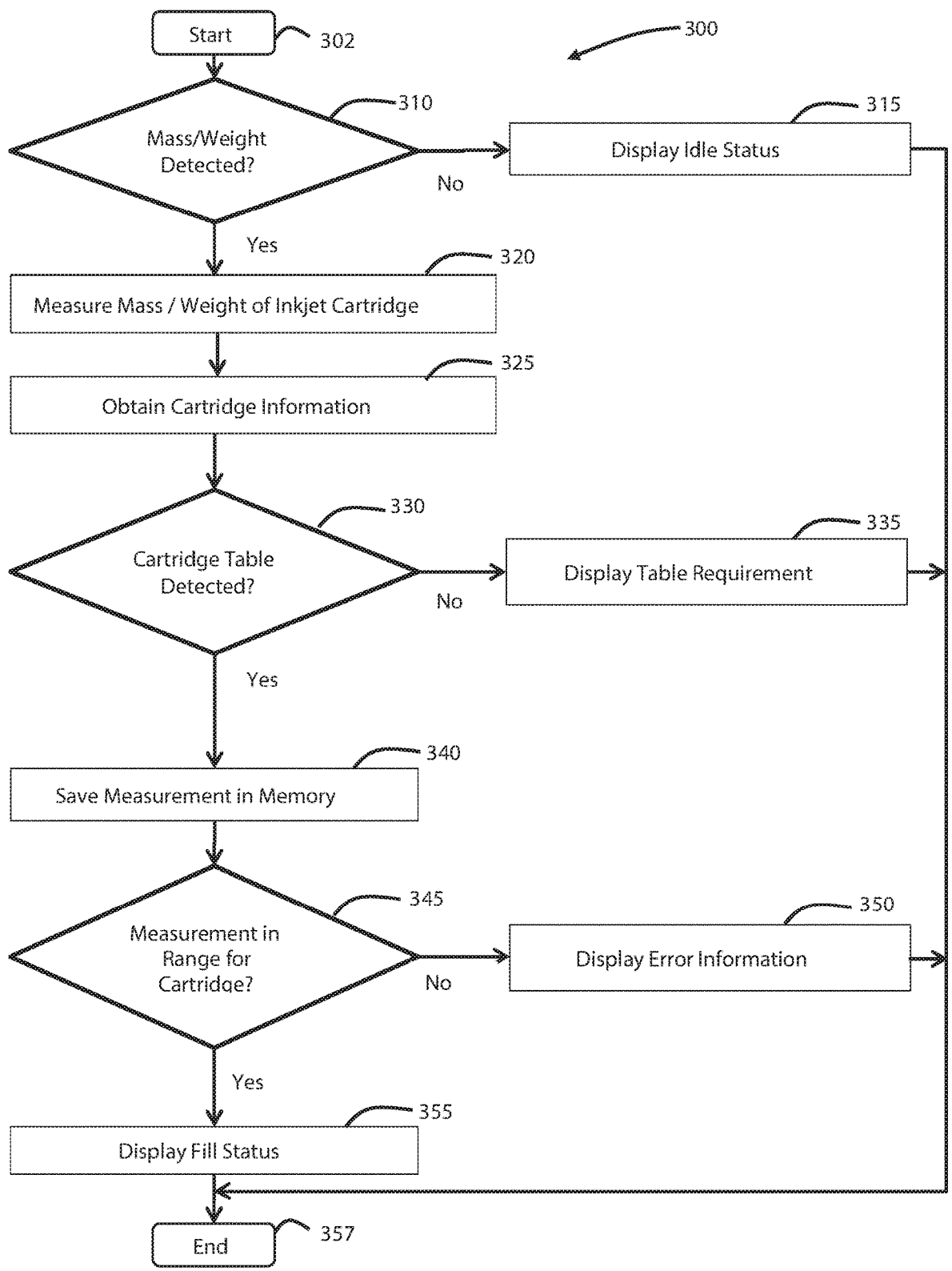
FIG. 6 is a flow diagram of an embodiment for determining a fill status of an inkjet cartridge.

Referring now to FIG. 6, a flowchart of an embodiment of a method 300 for providing a fill status of an inkjet cartridge. The method 300 as described herein may be employed after using the other components of the refilling system 250 as described above and shown in FIG. 5; however, the order of this sequence can be reversed, with the refilling system 250 being utilized after, or in between, any of the steps described in method 300. In some embodiments, one goal of the fill status determination method 300 is to provide an approximation of the fill status of the inkjet cartridge after the inkjet cartridge has been serviced and refilled. This can ensure that the refilling operation was successful. However, the fill status determination method 300 can be performed prior to servicing and refilling of an inkjet cartridge. This can provide the existing fill status of the inkjet cartridge prior to servicing and refilling. In some instances, the inkjet cartridge may be sufficiently filled that the operator (or customer) may decide to hold off on servicing and refilling the inkjet cartridge.

In some embodiments, the system and method 300 described below is an integrated part of the inkjet refilling system 250 which can include scale 200 attached thereto. In other embodiments, the method 300 can be implemented in a standalone version of the scale 200. For example, the method 300 can be implemented on the scale 200 without connecting the scale 200 to the inkjet refilling system 250. For purposes of the disclosure below, the method 300 will be described in connection with inkjet refilling system 250 which can include the scale 200. However, it is to be understood that in some embodiments the method may be performed by the scale 200 separately from the inkjet refilling system 250.

The method 300 can start at block 302 and move to block 310 where the inkjet refilling system detects whether an inkjet cartridge has been placed on a scale, such as scale 220. The system can perform this process by comparing an electrical signal received from a sensor, such as sensor 222, with a default (e.g., "zeroed" or calibrated) signal from the sensor. If the system does not detect a deviation from the default signal, the method 300 can proceed to block 315. In some embodiments, the system can provide a notification to the user that the system remains in an idle state. The method 300 can proceed to block 357 whereby the method ends.

If the system detects a deviation from the default signal, the method 300 can proceed to block 320. At block 320, the system measures a mass or weight of the inkjet cartridge based on a deviation of the received signal from the sensor and the default signal. In some embodiments, the system can be calibrated to increase accuracy of the system. In some instances, such calibration can be performed periodically.

The method 300 can then proceed to block 325, where the system can obtain cartridge information, such as a cartridge type. In some embodiments, the system can obtain this information from other components of the system. For example, the system can include a reader which can detect a cartridge type based on electronics on the inkjet cartridge. In some embodiments, the system can obtain this information from a user input or from the inkjet cartridge itself.

The method 300 can then proceed to block 330, where the system can determine whether cartridge information for the obtained cartridge type exists. The cartridge information can be stored in memory residing within the scale, memory residing within other components of the inkjet refilling system, or offsite. If the system does not detect cartridge information, the method 300 can proceed to block 335. At block 335, the system can provide a notification to the user that the system cannot locate information (e.g., a table) for the inkjet cartridge and move to block 357 wherein the method ends. In some embodiments, the system may provide the user with options to obtain this information. For example, the system may prompt a user to allow the system to attempt to download this information from an offsite source (e.g., an offsite server) or for the user to provide a location from which the information can be downloaded (e.g., web address, removable drive, etc.).

If the system locates cartridge information, the method 300 can proceed to block 340. At block 340, the system can save the measurement in memory. In some embodiments, the saved measurement can be utilized to update the cartridge information and/or to track performance of the inkjet refilling system.

The method 300 can then proceed to block 345, where the system can compare a mass or weight of the inkjet cartridge with measurements within the cartridge information. If the system determines that the measurement is outside the range for the inkjet cartridge (i.e., greater than the highest mass or less than a lowest mass in the cartridge information), the method 300 can proceed to block 350. At block 350, the system can provide a notification to the operator that the inkjet cartridge appears to be outside the range for the inkjet cartridge. This can indicate to an operator that either the wrong type of inkjet cartridge was analyzed, the cartridge was improperly filled, or that there may be a defect with the inkjet cartridge. The system may provide additional information to the operator to resolve the issue. The method 300 can proceed to block 357 whereby the method ends.

If the system determines that the measurement is within the range for the inkjet cartridge, the method 300 can proceed to block 355. At block 355, the system can display fill status of the inkjet cartridge. In some embodiments, the fill status can be displayed as a general estimate based on pre-defined ranges within the cartridge information—an example of which is shown below as Table T1. This general estimate may be sufficient due to variances in inkjet cartridge construction which may cause variances in measured weights among a cartridge type. In some embodiments, the displayed fill status can be more specific and provide either a percentage and/or a measured weight of the inkjet cartridge. After displaying the fill status, the method 300 can proceed to block 357 whereby the method ends.

TABLE T1

CARTRIDGE INFORMATION

| Fill Status | Mass |
|---|---|
| Completely Full | 48 g-50 g |
| Almost Full | 44 g-48 g |
| Half Full | 36 g-44 g |
| Low | 32 g-36 g |
| Empty | 30 g-32 g |

In some embodiments, the fill status can be based on a calculated percentage of a pre-defined mass or weight for that cartridge—an example of which is shown below as Table T2. For example, the inkjet cartridge may have a pre-defined mass of 50 g. The system may measure the mass of the inkjet cartridge and determine that the inkjet cartridge has a mass of 48 g thereby resulting in a percentage of 96% or "completely full" status. In some implementations, the same or similar range of percentages can be applied across multiple types of inkjet cartridges. For example, the same or similar range of percentages can be applied across inkjet cartridges within the same family, or even to all inkjet cartridges.

TABLE T2

CARTRIDGE INFORMATION

| Fill Status | Mass |
|---|---|
| Completely Full | 95%-100% |
| Almost Full | 85%-95% |
| Half Full | 75%-85% |
| Low | 65%-75% |
| Empty | 60%-65% |

In some embodiments, the fill status can be based on a calculated percentage of a pre-defined fill mass or fill weight for that cartridge—an example of which is shown below as Table T3. For example, the inkjet cartridge may have a pre-defined full mass of 50 g and a pre-defined empty mass of 30 g. As such, the pre-defined fill mass of this particular inkjet cartridge would be 20 g. The system may measure the mass of the inkjet cartridge and determine that the inkjet cartridge has a mass of 49 g thereby resulting in a fill mass of 19 g. A fill mass of 19 g is 95% of the pre-defined fill mass (i.e., "completely full" status). In some implementations, the same or similar range of percentages can be applied across multiple types of inkjet cartridges. For example, the same or similar range of percentages can be applied across inkjet cartridges within the same family, or even to all inkjet cartridges.

TABLE T3

CARTRIDGE INFORMATION

| Fill Status | Mass |
|---|---|
| Completely Full | 90%-100% |
| Almost Full | 70%-90% |
| Half Full | 30%-70% |
| Low | 10%-20% |
| Empty | 0%-10% |

It is to be understood that the steps of method 300 can be interchanged. Moreover, it is to be understood that one or more of the steps of method 300 can be omitted. For example, the method 300 can omit the step of saving measurements in memory as shown in block 340.

Other Embodiments

While certain embodiments have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope of the disclosure. Accordingly, the scope of the present disclosure is defined only by reference to the claims presented herein or as presented in the future.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a sub combination.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A system for refilling an inkjet cartridge and determining a fill status of an inkjet cartridge, the system comprising:
a fill station configured to refill an inkjet cartridge;
a scale comprising a sensor configured to measure the mass or weight of an inkjet cartridge;
a user interface; and
a control system configured to:
receive, via the user interface, a type of inkjet cartridge from a user;
measure, using the scale, the mass or weight of the inkjet cartridge;
determine a fill status of an inkjet cartridge by:
looking up a fill weight of the inkjet cartridge from a table of inkjet cartridge fill weights using the type of inkjet cartridge;
matching the measured mass or weight of the inkjet cartridge to the fill weight to determine a difference; and
identifying the fill status of the inkjet cartridge based on the difference; and
display the fill status on the user interface.

2. The system of claim 1, wherein the type of inkjet cartridge is received via a user input.

3. The system of claim 1, wherein receiving the type of inkjet cartridge further comprises reading electronics of the inkjet cartridge.

4. The system of claim 1, wherein the fill status comprises a discrete number of statuses corresponding to ranges of pre-defined measurements of the type of inkjet cartridge.

5. The system of claim 4, wherein the ranges of pre-defined measurements comprise at least one of pre-defined masses or weights of the type of inkjet cartridge.

6. The system of claim 4, wherein the ranges of pre-defined measurements comprise percentages of a pre-defined mass or weight of the type of inkjet cartridge.

7. The system of claim 4, wherein the ranges of pre-defined measurements comprise percentages of a pre-defined fill mass or fill weight of the type of inkjet cartridge.

* * * * *